Oct. 12, 1943.                J. P. SEAHOLM                2,331,738
             BEARING AND SPACING DEVICE FOR DISK HARROWS
                        Filed Feb. 8, 1941
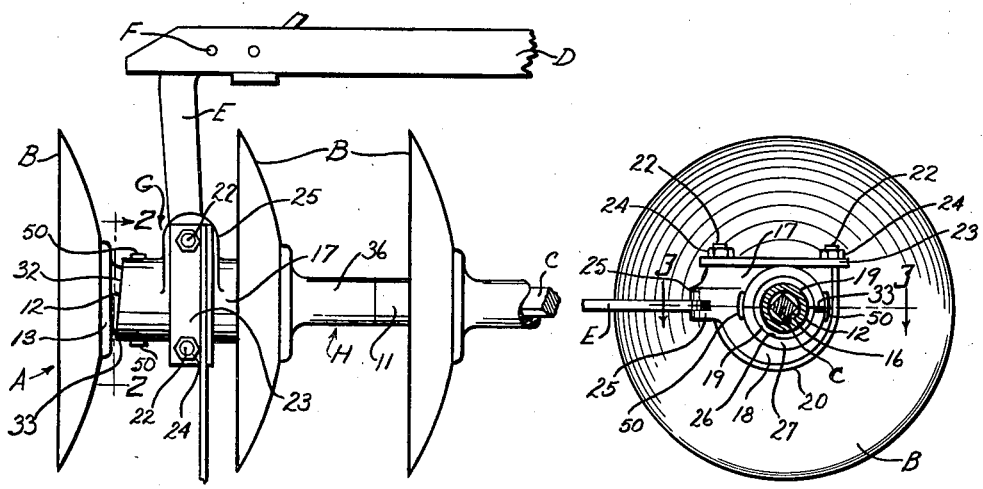
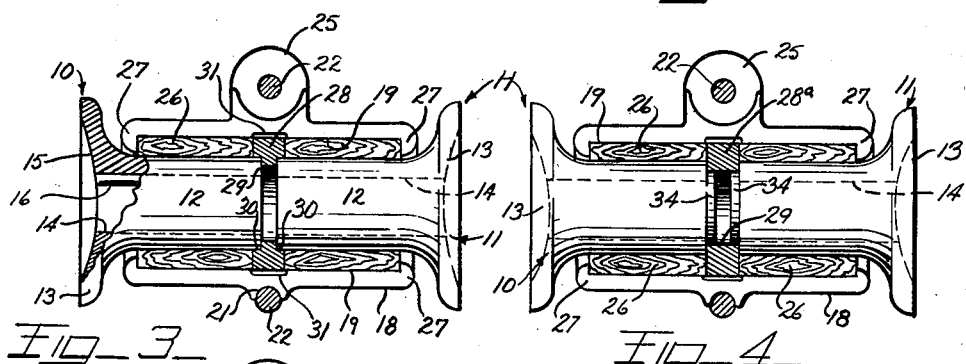
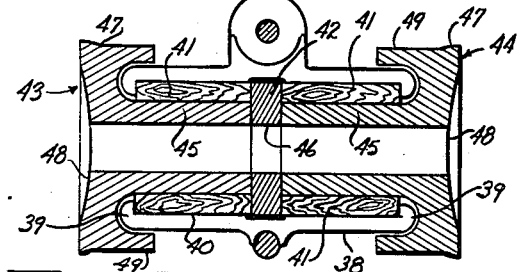  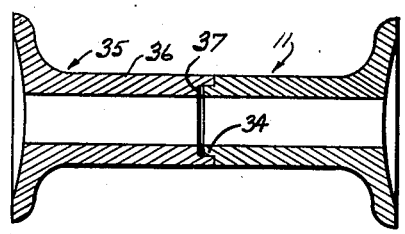
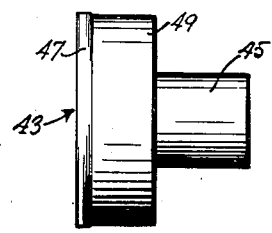
Inventor
JOHN P. SEAHOLM
By Carlsen + Hoyle
Attorneys Patented Oct. 12, 1943

2,331,738

UNITED STATES PATENT OFFICE 2,331,738

BEARING AND SPACING DEVICE FOR DISK HARROWS

John P. Seaholm, Moline, Ill., assignor to Minneapolis-Moline Power Implement Company, Minneapolis, Minn., a corporation of Delaware Application February 8, 1941, Serial No. 378,004

11 Claims. (Cl. 308—19)

This invention relates generally to disk harrows and more particularly to improvements in bearing construction and spacing means for the gangs and disks of such implements.

The primary object of the invention is to provide an improved bearing construction for making draft or operating connections to the disk gangs and with novel and efficient means for properly centering and aligning the spools or spindles used between the individual disks of the gangs. Another object is to provide an improved bearing and spool or spindle assembly embodying sectional construction and including a thrust washer arranged and adapted to not only radially center and align the respective spool or spindle sections but to receive the end thrust thereof and center the parts axially in the bearing. A further object is to provide an improved bearing including means to prevent the accumulation and entrance of dirt at the ends of the bearing and prevent such matter from working into the bearing.

These and other more detailed and specific objects will be disclosed in the course of the following specification, reference being had to the accompanying drawing, in which—

Fig. 1 is a fragmentary plan view of a disk gang, showing my improved bearing and spacing spool or spindle applied thereto.

Fig. 2 is a vertical cross section along the line 2—2 in Fig. 1.

Fig. 3 is an enlarged horizontal section along the line 3—3 in Fig. 2 but showing only the lower bearing sections, spool or spindle and associated parts.

Fig. 4 is a view similar to Fig. 3 but showing a modified form of spool or spindle and thrust washer.

Fig. 5 is another similar view but showing a further modified form of spool or spindle and thrust washer.

Fig. 6 is a longitudinal diametrical section through a spacing spool or spindle alone embodying my invention.

Fig. 7 is a side elevation of one of the spool or spindle sections shown in Fig. 5.

The present application is a continuation in part from my copending application for patent on a Disk harrow, Serial No. 338,076, filed May 31, 1940.

Referring now more particularly to the drawing, A represents generally a disk gang, only an end portion of which is shown, and which is made up of a series of dished disks B arranged in spaced relation along a square shaft C and disposed behind a frame or draft bar D. To connect the disk gang to the frame for draft purposes a drag link E is employed, attached at its forward end F to the bar D and at its rear end connected to a bearing G which constitutes a part of the present invention.

The disks B are held in spaced relation along the shaft C by means of spacing spools, spindles or barrels as indicated at H and which also constitute an important feature of this invention. These spools, as they will be termed in this specification, not only serve as spacing means for the disks B but also as journals for the mounting of the gangs in the bearings whenever they are engaged by such bearings.

The spool as shown in Figs. 1, 2 and 3 includes two similar complementary sections or members 10 and 11 each of which has the cylindrical barrel 12 and diametrically enlarged end flange or bell 13. The spool sections also have axially aligned bores 14 adapted to receive the shaft C and, when assembled in end to end relation upon said shaft, the two sections assume a spool-shape with the flanges 13 turned outwardly to engage and space the adjacent disks B. The flanged ends of the spool sections may be concaved out as shown at 15 to thereby fit either the concaved or convexed sides of the disks as may be required. The bores 14 may be either of square, or other rectilinear, shape to fit the shaft C and cause the spools to turn therewith or such bores may be circular and locked to the shaft by a key or lug 16 cast lengthwise along the bore to engage one side of the shaft (Fig. 2).

The bearing G includes separable upper and lower sections or halves 17 and 18 having mating recesses 19 at their inner sides adapted to provide a bore through which the spool may freely pass when the bearing is assembled between the spool flanges 13. As here shown the bearing sections 17—18 are releasably connected and secured in assembled relation around the spool by a U-bolt 20 which fits at its lower portion around a groove 21 in lower bearing section 18 and has its legs 22 passed upwardly through and behind the upper section 17 and through a clip or plate 23. Nuts 24 are then turned down on the ends of the bolt to draw the bearing sections together. Each bearing section has a forwardly turned lug 25 apertured to pass the forward U-bolt leg 22 and spaced apart vertically to receive the rear end of the drag link E which is pivotally mounted on said U-bolt leg.

The recesses 19 defining and forming the bore of the bearing are considerably larger than the spool barrels 12 and receive therein the bearing bushings 26 which are of oil impregnated wood or similar material and engage the barrels 12 as shown in Fig. 3. These bushings may be made in semi-circular halves or sections to correspond with the bearing parts and to facilitate assembly. The ends of the bearing sections 17—18 have inwardly turned annular lips or retaining shoulders 27 to engage the bushings 26 and prevent them from working endwise out of the bearing.

In accordance with my invention the spool sections 10—11 in their assembled relation within the bearing are spaced apart at their inner ends to receive therebetween a thrust washer or centering ring 28 which is of such external diameter as to just nicely fit within the recesses 19 of the assembled bearing sections. Said washer 28 thus also spaces the bearing bushings 26 apart as clearly shown. The inner diameter of the washer is less than the external diameter of the spool barrels 12 but clears the shaft C as represented at 29. On each side, however, the washer 28 is counterbored to provide annular recesses 30 which will just nicely fit the inner ends of the spool bearings 12.

In operation the disk gang may, of course, turn freely in the bearing G and the bearing bushings 26 will reduce friction on the rotating spool and provide adequate lubrication therefor. The bushings will also lubricate the thrust washer 28, which turns with the spool sections, and it will be noted that the center of the annular walls of the recesses 19 are enlarged, as at 31, to clear the outer periphery of the washer and prevent wear and friction at this point. The washer 28 by its engagement with the inner ends of the spool sections acts to center them radially and retain them in proper axial alignment so as to prevent uneven wear of the bearing and this is an important feature and function of the thrust washer. The making of the spool in two sections permits it to be cast in a metal mold, instead of a sand mold as would otherwise be required, and the shape and size may thus be so accurate as to require little, if any, surfacing or machining around the outer periphery of the barrels 12 to fit the bushings 26 and counterbores 30 of the thrust washer.

Attention is directed to the fact that the ends of the bearing sections 17—18 are not cut off at right angles to the bearing axis but instead are angularly formed so that, when the sections are assembled, their ends will have a helical shape as represented at 32. Abutments or shoulders 33 are thus formed which will plow or scrape off the dirt which may have a tendency to accumulate between the bearing ends and adjacent flanges 13 of the spool. These abutments are accordingly so disposed, with reference to the direction of rotation of the disks and spools, that they will meet such accumulated dirt and work it off ahead while, as the abutments are passed, the space between bearing ends and spool flanges will gradually increase due to the helical shape of said ends and thus prevent the dirt from being crowded or forced into the bearing.

The bearing and spool assembly of Fig. 4 is similar to that just described, the spool sections 10—11 being assembled in end to end relationship within the bearing, only the lower section 18 of which is shown, and engaging the bearing bushings 26. The thrust washer 28a in this case, however, is not counterbored but instead the inner ends of the spool barrels 12 are reduced in diameter to provide annular shoulders or extensions 34 nicely entering and fitting the inner bore 29 of the washer. All other parts are substantially identical to those previously described and obviously this construction of the washer and spool barrels will operate in the same manner as that shown in Fig. 3.

The spool construction as shown in Fig. 4 has one advantage, however, over others herein shown. For each spacing spool, not entering a bearing, one section 11 of the spool may be employed (Fig. 6) in connection with another section 35 the barrel 36 of which has its inner end recessed out annularly at 37 to receive the shoulder or reduced extension 34. A two piece spool is thus provided having alignment means at the center of the sections and the shape of which permits casting in a metal mold as mentioned above.

The spool and bearing structure of Figs. 5 and 7 is somewhat different from those previously described. The bearing, only the lower section 38 of which is again shown, has the straight ends 39 and recess 40 receiving the bushings 41 and interposed thrust washer 42. The spool sections 43—44 have barrels 45 which enter the bushings 41 and bear at inner ends against the washer 42 which in this case has its center bore 46 fitted to the shaft C and without any centering means for the spool sections. Either type of spool centering as shown in Fig. 3 or 4 could be used, however.

The diametrically enlarged ends 47 of the spool sections 43—44 are concaved at 48 to fit the disks and these ends further have the inwardly turned, annular skirts or flanges 49 which enclose and extend around the ends of the bearing as clearly shown. These skirts thus act to largely exclude dirt and similar foreign matter from entering the bearing as will be clearly evident.

The bearing sections, particularly as shown in Figs. 1–4, are provided with aligning lugs 50, the purpose of which is to ensure that the bearing sections will be properly assembled in order to dispose the spirally shaped ends 32 thereof in the proper relative position to the flanges of the spools.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In a disk harrow having spaced disks and a supporting shaft therefor, a spool adapted to be positioned on the shaft for spacing adjacent disks apart, said spool being made in two sections, a bearing for receiving the spool and spanning the junction of the two sections thereof, a thrust washer positioned in the bearing between the inner ends of the spool sections, the said washer being of greater diameter than the parts of the spool enclosed by the bearing, and bushings retained within the bearing around the spool sections and engaging the opposite sides of the thrust washer.

2. A bearing structure for a disk harrow having a shaft and disks spaced thereon, comprising a pair of spool sections disposed in end to end position on the shaft as spacers for two adjacent disks, a thrust washer of greater diameter than the spool sections and disposed between the adjacent ends thereof, cooperating means on the washer and spool sections for axially aligning the latter with respect to each other, and bearing means engaging the spool sections at each side of the thrust washer, the said bearing means engaging the sides, but clearing the outer peripheral surface, of the thrust washer.

3. In a disk harrow having spaced disks and a supporting shaft therefor, a spool adapted to be positioned on the shaft for spacing adjacent disks apart, said spool being made in two sections, a bearing for receiving the spool and spanning the junction of the two sections thereof, a thrust washer positioned in the bearing between the inner ends of the spool sections, the said washer being of greater diameter than the parts of the spool enclosed by the bearing, and bushings retained within the bearing around the spool sections and at opposite sides of the thrust washer, the said bearing having means at its ends for engaging the bushings and maintaining them in endwise engagement with the thrust washer.

4. In a disk harrow structure including a gang having a series of disks and spools placed therebetween, the said spools having diametrically enlarged flanges at their ends, a bearing engaging one spool between its end flanges, and the said bearing having its ends of helical shape and having abutments faced in opposition to the normal direction of rotation of the gangs to scrape off dirt from between the bearing ends and spool flanges.

5. In a disk harrow structure including a disk gang having a series of disks and spools placed therebetween, the said spools having diametrically enlarged ends, flanges, a bearing for engaging one of the spools, and the ends of the bearing being helical in shape to thereby provide a space of varying width between bearing ends and flanges.

6. In a disk harrow including a series of spaced disks, a spacing spool for spacing two adjacent disks apart, said spool having two sections disposed in end to end relation and spaced apart at adjacent ends, a thrust washer positioned between and rotatably engaging the inner ends of the spool sections, and cooperating means on the spool ends and washer for axially aligning the spool sections with each other.

7. In a disk harrow including a disk gang made up of a series of spaced disks, a spool for spacing two adjacent disks apart, said spool comprising two sections disposed in end to end relation and spaced apart a short distance at adjacent ends, a thrust washer disposed between the ends of the spool sections, said thrust washer being of greater external diameter than the spool ends and having counterbores rotatably engaging end and peripheral surfaces of the spool ends to axially align the spool sections.

8. In a disk harrow including a series of spaced disks, a spool for spacing two adjacent disks, said spool being made in two sections adapted to be arranged in spaced end to end relation, the adjacent ends of the spool sections having narrow diametrically reduced extremities, and a thrust collar disposed between the spool sections and rotatably engaging the reduced extremities thereof to maintain the sections in axial alignment.

9. In a disk harrow including a gang having a shaft and a series of disks thereon, said shaft being of rectilinear cross section, a spool adapted to be placed on said shaft between two adjacent disks to space the same apart, said spool having a round bore of such diameter as to freely and rotatably engage the shaft, and a lug extending lengthwise within said bore for engaging one side of the shaft and anchoring the spool for rotation with the shaft.

10. A bearing structure for a disk harrow having a shaft and disks spaced thereon, comprising a pair of spool sections disposed in end to end position on the shaft as spacers for two adjacent disks, a thrust washer of greater diameter than the spool sections and disposed between the adjacent ends thereof, and bearing means engaging the spool sections at each side of the thrust washer, the said bearing means engaging the sides, but clearing the outer peripheral surface, of the thrust washer.

11. A spool and bearing structure for a disk harrow having at least two disks assembled in spaced relation on a shaft, comprising a spool having two complementary sections adapted to be assembled on the shaft in end to end relation between the disks, a bearing member enclosing the adjacent ends of the spool sections, and a separate thrust washer interposed between the adjacent ends of the spool sections, the said thrust washer being rotatably engaged with the adjacent ends of the spool sections to hold them in axial alignment.

JOHN P. SEAHOLM.